United States Patent [19]
Gauthier

[11] Patent Number: 5,474,350
[45] Date of Patent: Dec. 12, 1995

[54] AUXILIARY SHAFT HAVING A BALL-SHAPED END RELEASABLY MOUNTED IN A TWO-PART SLEEVE, FOR HAND TOOLS

[76] Inventor: Serge Gauthier, 9150 Louis Lumière, Rivière Des Prairies, Qc., Canada, H1E 4E3

[21] Appl. No.: 326,340

[22] Filed: Oct. 20, 1994

Related U.S. Application Data

[63] Continuation-in-part of Ser. No. 144,424, Nov. 2, 1993, abandoned.

[51] Int. Cl.[6] .............................. A01B 1/22; B25G 3/38
[52] U.S. Cl. ............................................ 294/58; 16/114 R
[58] Field of Search ......................... 294/54.5, 57–59; 15/114.2, 145; 16/110 R, 111 R, 114 R; 81/177.75, 177.85; 403/90, 114, 122, 124, 141, 143

[56] References Cited

U.S. PATENT DOCUMENTS

| | | | |
|---|---|---|---|
| 320,436 | 6/1885 | Hock | 15/144.2 |
| 1,151,012 | 8/1915 | Herringstad | 294/58 |
| 3,843,083 | 10/1974 | Angibaud | 403/90 X |
| 4,059,360 | 11/1977 | Tessier | 403/141 X |
| 4,200,324 | 4/1980 | Helton | 294/58 |
| 4,944,541 | 7/1990 | Waldschmidt | 294/58 |
| 4,980,805 | 12/1990 | Maglica et al. | 403/141 X |

FOREIGN PATENT DOCUMENTS

| | | | |
|---|---|---|---|
| 948860 | 8/1949 | France | 294/58 |
| 600702 | 7/1934 | Germany | 15/144.2 |
| 568515 | 4/1945 | United Kingdom | 294/58 |
| 2266438 | 11/1993 | United Kingdom | 294/58 |

*Primary Examiner*—Johnny D. Cherry
*Attorney, Agent, or Firm*—Antoine H. Gauvin

[57] ABSTRACT

A three-part auxiliary shaft assembly to be mounted along a hand-tool shaft, comprises a two-part sleeve and an auxiliary shaft which is ball-shaped at one end. The sleeve has a top, a bottom and a symmetrical axis running from top to bottom, and is cut in half along the symmetrical axis to define the two parts of the two-part sleeve. Each part has an inner hemi-housing parallel to the symmetrical axis of the sleeve, and running from the top to the bottom of the sleeve for tight-fitting half the cross-section of a portion of a hand-tool shaft. Near the top away from the inner hemi-housing, a second inner hemi-housing for half the ball-shaped end of the auxiliary shaft has an opening at the top, shorter than the diameter of the ball-shaped end of the auxiliary shaft. When the two parts of the sleeve are assembled, a housing is provided for the ball-shaped end of the auxiliary shaft, as well as a housing for the portion of a hand-tool shaft. These two parts are held with bolts positioned away from the opening at the top, so that over a certain pulling tension of the auxiliary shaft, it is releasable from its housing.

15 Claims, 2 Drawing Sheets

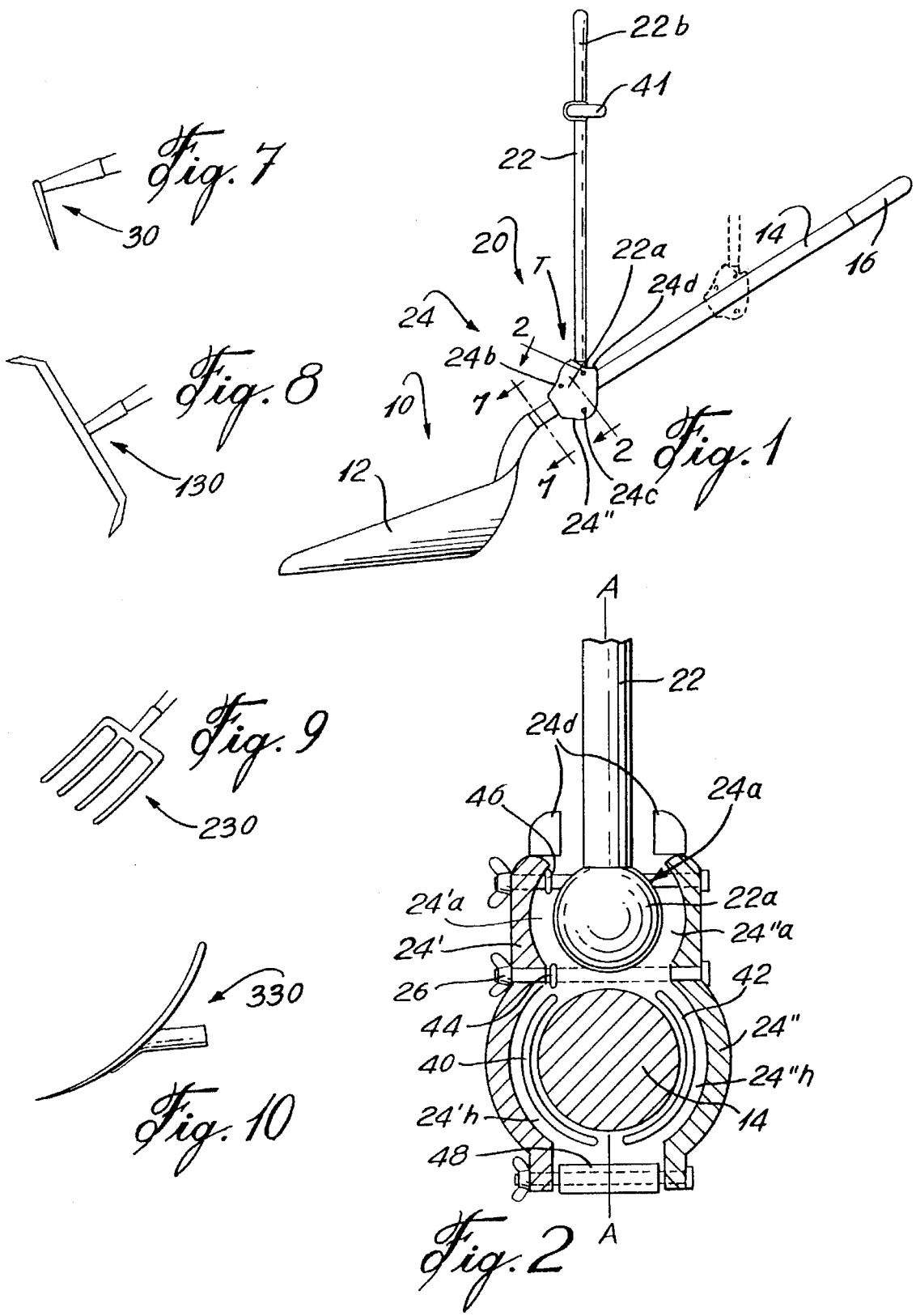

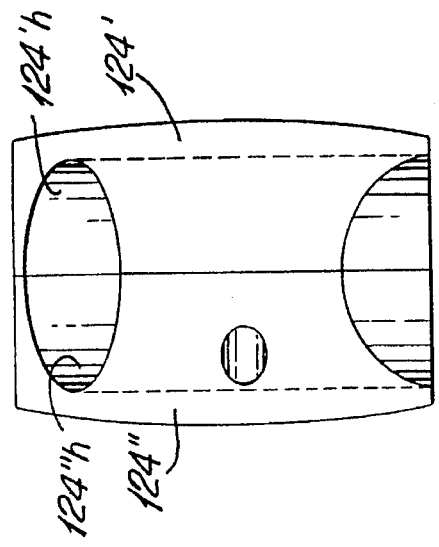
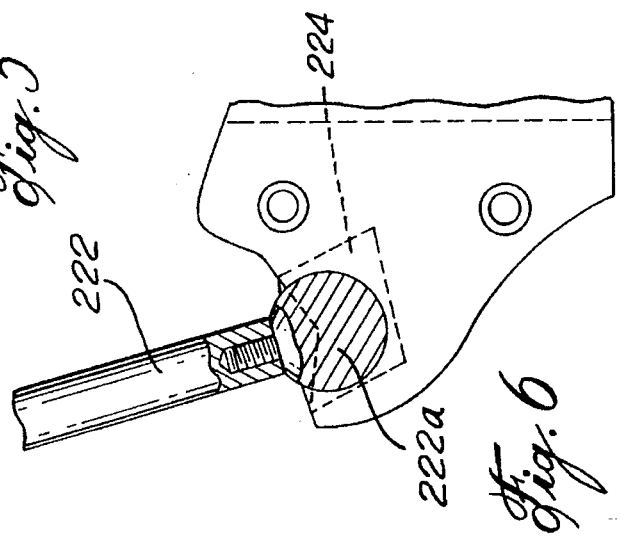
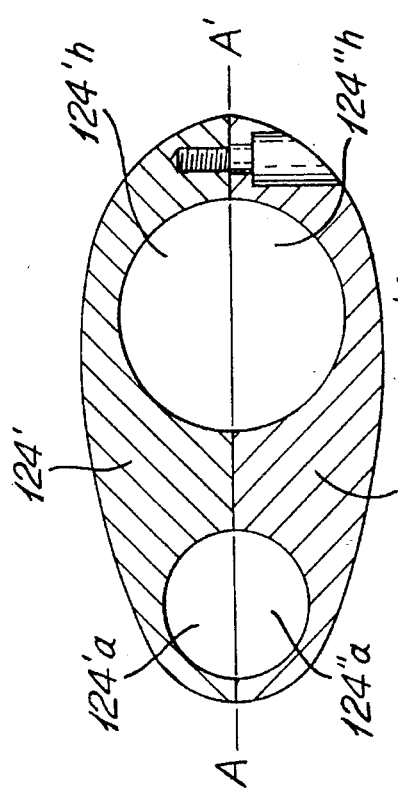
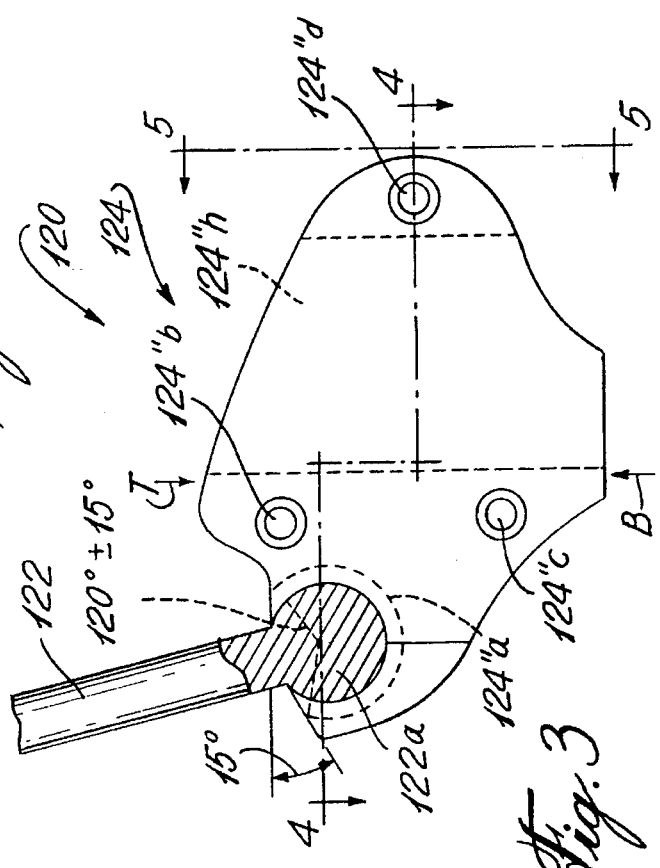

AUXILIARY SHAFT HAVING A BALL-SHAPED END RELEASABLY MOUNTED IN A TWO-PART SLEEVE, FOR HAND TOOLS

This application is a continuation-in-part of U.S. application Ser. No. 08/144,424 dated Nov. 2, 1993 which is now abandoned.

BACKGROUND OF THE INVENTION

1. Field of the Invention

This invention relates to an auxiliary shaft having a ball-shaped end releasably mounted in a two-part sleeve, for hand tools. This invention is particularly directed to such adjustable auxiliary shaft assemblies cooperating with hand tools having normally a single shaft such as shovels, rakes, scrapers, snow plows, forks snow pushers, squeegees and other hand tools for lifting, picking-up, transporting, pulling and pushing a variety of materials including but not limited to snow, sand, dirt, leaves, powders, earth, vegetables.

2. Description of Related Art

There are a plethora of references describing handle accessories for work tools, such as:

U.S. Pat. No. 933,647 dated Sep. 7, 1909 as invented by Hunt,

U.S. Pat. No. 842,912 dated Feb. 5, 1907 as invented by Rundell,

U.S. Pat. No. 1,151,012 dated Aug. 24, 1915 as invented by Herringstad,

U.S. Pat. No. 2,430,802 dated Dec. 11, 1947 as invented by Catlin,

U.S. Pat. No. 4,050,728 dated Sep. 27, 1977 as invented by Davidson,

U.S. Pat. No. 4,128,266 dated Dec. 5, 1978 as invented by Vaslas,

U.S. Pat. No. 4,155,582 dated May 22, 1979 as invented by Reisner,

U.S. Pat. No. 4,200,324 dated Apr. 29, 1980 as invented by Helton,

U.S. Pat. No. 4,944,541 dated Jul. 31, 1990 as invented by Waldschmidt,

U.K. Patent 568,515 dated Apr. 9, 1945 as invented by Baugh,

U.K. Patent Application 2 156 641 dated Sep. 20, 1984 as invented by Cook,

Austrian Patent 165574 dated Mar. 25, 1950 as invented by Exenberger,

Japanese Patent 61-146927 dated Jul. 4, 1986 as invented by Irisawa,

German Patent 410274 dated Mar. 4, 1925 as invented by Bucker, and

French Patent 948,860 dated Aug. 12, 1949 as invented by Dobrigkeit.

These, however, have a handle which is pivotally mounted about a pivot or fixed or fastened.

The prior art offers no solution to prevent back injuries and hernias to a manipulator handling an overload. The prior art is silent regarding a simple two-part sleeve releasably holding an auxiliary shaft, for easily coupling to hand tools having a conventional single shaft such as shovels, rakes and the like, whereby under an overload the auxiliary shaft is released in order to prevent body injuries.

SUMMARY OF THE INVENTION

Broadly stated, the invention is directed to a three-part auxiliary shaft assembly to be mounted along a hand-tool shaft, comprising:

an auxiliary shaft, and a two-part sleeve, said auxiliary shaft having one end and another end, said one end of said auxiliary shaft being ball-shaped, said ball-shaped end having a diameter, said sleeve having a top, a bottom and a symmetrical axis running from said top to said bottom, and said sleeve being cut in half along said symmetrical axis to define the two parts of said two-part sleeve, each part of said two-part sleeve, defining:

an inner hemi-housing parallel to said symmetrical axis of said sleeve, and running from said top to said bottom of said sleeve, for tight fitting of half the cross-section of a portion of a hand-tool shaft, and near said top away from said inner hemi-housing for said hand-tool shaft, an inner hemi-housing for receiving half of said ball-shaped end of said auxiliary shaft and said inner hemi-housing having an opening at said top, said opening being smaller than the diameter of said ball-shaped end of said auxiliary shaft, and said two parts of said sleeve being releasably fastened together with bolt means positioned away from said opening at said top of said housing for said ball-shaped end, said two parts of said sleeve, when assembled, thus defining:

a) an inner housing for said ball-shaped end, with an opening at said top smaller than the diameter of said ball-shaped end of said auxiliary shaft in order:

i) to releasably hold within said housing the ball-shaped end up to a given pulling tension exerted on the auxiliary shaft to separate said shaft from said inner housing, and under said given pulling tension to allow rotation of said ball-shaped end within said housing, ii) to allow the passage of said auxiliary shaft near said one end of said shaft, iii) to release said shaft from said sleeve, when the tension is greater than said given pulling tension, and b) said inner hemi-housings parallel to said symmetrical axis acting as a pair of jaws, in order to clamp said portion of a hand-tool shaft.

The invention is particularly directed to a three-part auxiliary shaft assembly to be mounted along a hand-tool shaft, comprising:

an auxiliary shaft, and a two-part sleeve, said auxiliary shaft having one end and another end, said one end of said auxiliary shaft being ball-shaped, said ball-shaped end having a diameter, said sleeve having a top, a bottom and a symmetrical axis running from said top to said bottom, and said sleeve being cut in half along said symmetrical axis to define the two parts of said two-part sleeve, each part of said two-part sleeve, defining an inner hemi-cylindrical housing parallel to said symmetrical axis of said sleeve, and running from said top to said bottom of said sleeve for tight fitting half the cross-section of a portion of a hand-tool shaft, and near said top away from said inner hemi-cylindrical housing, and stopping short of said top, an inner hemi-spherical housing for receiving half of said ball-shaped end, said hemi-spherical housing being also short of a hemi-spherical segment at said top, and said two parts of said sleeve being releasably fastened together with bolt means positioned away from said opening at said top resulting from said hemi-spherical segments in said hemi-spherical housing, said two parts of said sleeve, when assembled, defining:
  a) an inner truncated globular housing for said ball-shaped end, in order:
    i) to releasably hold within said globular housing the ball-shaped end up to a given pulling tension exerted on the auxiliary shaft to separate said shaft from said globular housing, and under said given pulling tension to allow rotation of said ball-shaped end within said housing,
    ii) to allow the passage of said auxiliary shaft near said one end of said shaft,
    iii) to release said shaft from said globular housing and thereby said sleeve, when the tension is greater than said given pulling tension,
  and b) said inner hemi-cylindrical housings parallel to said symmetrical axis, acting as a pair of jaws, in order to clamp said portion of a hand-tool shaft.

The inner hemi-housings are generally of cylindrical shape according to the usual cross-sectional shape of the hand-tool shaft, but may be of other polygonal cross-sections, according to the cross-sectional shape of the hand-tool shaft or approaching that shape of the shaft without corresponding exactly thereto.

The term: "releasably fastened" throughout the specification including the disclosure and claims, means something to hold together the two parts of the sleeve, which can be easily removed such as bolts and nuts.

This ingenious adjustable auxiliary shaft assembly is simple to produce, easy to mount onto, or to remove from, hand-tool shafts and is relatively inexpensive with respect to the advantages to be derived therefrom.

This adjustable auxiliary shaft assembly, aside from eliminating, or at least reducing bending to lift, pick-up, transport, pull and push and to that extent reducing susceptibility to back injuries, has the ability to monitor the pulling tension exerted on the auxiliary shaft and to release that auxiliary shaft over a given pulling tension; that auxiliary shaft being as a snap-out shaft.

Other embodiments will be described herein below.

BRIEF DESCRIPTION OF THE DRAWINGS

Referring now to the drawings which illustrate some of the preferred embodiments of the invention:

FIG. 1 is a side view of a shovel with an adjustable auxiliary shaft assembly having an auxiliary shaft at a position away from a hand-tool shaft;

FIG. 2 is a section view taken along line 2—2 of FIG. 1;

FIG. 3 is a side view of another shaft assembly;

FIG. 4 is a section view taken along line 4—4 of FIG. 3;

FIG. 5 is an elevation view taken along line 5—5 of FIG. 3;

FIG. 6 is a fragmental side view of a shaft assembly similar to FIG. 3, cut along the housing for the hand tool shaft, but with a different housing for the ball-shaped end of the auxiliary shaft;

FIG. 7 is a side view of a rake taken along line 7—7 of FIG. 1;

FIG. 8 is a top view of a squeegee taken along line 7—7 of FIG. 1;

FIG. 9 is a view of a fork taken along line 7—7 of FIG. 1, upon rotation toward the viewer;

FIG. 10 is a side view of a snow push taken along line 7—7 of FIG. 1.

DETAILED DESCRIPTION OF THE SOME OF THE PREFERRED EMBODIMENTS OF THE INVENTION

Referring to FIGS. 1 and 2, a conventional shovel 10, having a blade or a scoop 12, a hand-tool shaft 14 and a handle 16, is provided with a three-part adjustable auxiliary shaft assembly 20.

The three-part adjustable auxiliary shaft assembly 20 which is mounted along the hand-tool shaft 14, comprises:

an auxiliary shaft 22, and a two-part sleeve 24.

The auxiliary shaft has one end 22a and another end 22b;

the one end 22a of the auxiliary shaft is ball-shaped and has a given diameter.

The sleeve has a top T, a bottom B and a symmetrical axis A (FIG. 2) running from the top to the bottom, and the sleeve is cut or split in half along the symmetrical axis as to define the two parts 24' and 24" of the two-part sleeve 24.

Each part of the two-part sleeve defines an inner hemi-housing 24'h and 24"h, respectively, parallel to the symmetrical axis of the sleeve, and running from the top to the bottom of the sleeve, for tight fitting of half the cross-section of a portion of the hand-tool shaft 14.

Each part of the two part-sleeve, further defines an inner hemi-housing for receiving half of the ball-shaped end of the auxiliary shaft, and the inner hemi-housing having an opening at the top, the opening being smaller than the diameter of the ball-shaped end of the auxiliary shaft; preferably, hemi-spherical housings 24'a, 24"a, the hemi-spherical housings being short of a hemi-spherical segment at the top, thereby providing a cut in said hemi-spherical housings. Those hemi-housings for receiving half of said ball-shaped end of the auxiliary shaft are adjacent to the top T of the sleeve, and spaced from the inner hemi-housings 24'h, 24"h, for said tight fitting of half the cross-section of a portion of a hand-tool shaft.

The two parts of the sleeve are releasably fastened together with bolt means pulling together the two parts of the sleeve. The bolt means are absent along the opening, as defined in the hemi-housing for the ball-shaped end.

Thus, the auxiliary shaft is ball-shaped at the one end 22a, and correspondingly the sleeve 24 is defining a globular extension 24a for housing the ball of the auxiliary shaft 22, or, the two parts of the sleeve, when assembled, define:
  a) an inner housing for said ball-shaped end, with an opening at said top smaller than the diameter of said ball-shaped end of said auxiliary shaft in order:
    i) to hold the ball-shaped end 22a, within said inner housing for the lall-shaped end, up to a given pulling tension exerted on the auxiliary shaft, and under that given pulling tension, to allow rotation of the ball-shaped end within the housing,
    ii) to provide a an opening enabling a spherical portion for the ball-shaped end of that auxiliary shaft near that shaft, to be displaceable outside of said inner housing for the ball-shaped end,
iii) to release the ball-shaped end of that auxiliary shaft from the inner housing for the ball-shaped end, and thereby from the two part of the sleeve, when the tension is greater than that given pulling tension, and b) the inner hemi-housings parallel to the symmetrical axis acting as a pair of jaws, in order to clamp that portion of a hand-tool shaft 14.

That globular housing is preferably stopping short with respect to the top of the inner hemi-housings parallel to the symmetrical axis acting as a pair of jaws.

Thereby each part of the sleeve defines therein half of the inner truncated globular housing to snap in and for releasably holding said ball-shaped end, and of the housing for holding the portion of a hand-tool shaft.

The inner hemi-housings 24'h, 24"h, for the portion of a hand-tool shaft 14 may have various cross-sections, and preferably a cross-section similar to that of the hand-tool shaft on which it slides.

The two halves or the two parts of the sleeve 24 are releasably fastened together with bolt means strategically positioned away from the opening at the top resulting from the hemi-spherical segments in the hemi-spherical housing, say along 24b and 24c, that is adjacent the hemi-housings; between the hemi-housings and the hemi-spherical housings, along the hemi-housing on one side and diametrically opposed to the hemi-housing, on the other side of the hemi-housing. The bolt means are, for instance, bolts and nuts including wing and butterfly nuts, or bolts 26 through one of the two parts of sleeve 24, either 24' or 24" the other part of the sleeve being female threaded for receiving the bolts.

Upon releasing the bolts or other fastening means, the sleeve 24 is slidable along the hand-tool shaft 14 and the auxiliary shaft at said another end 22b adjustable to a given position generally near the scoop 12 or other tools, and locked in said position by exerting tension with said bolt means to urge said two parts of the sleeve to squeeze therebetween said hand-tool shaft.

Also as shown in FIG. 2, less pressure may be exerted on the ball-shaped end 22a, whereby the frictional engagement of the ball-shaped end 22a, is adjusted with the bolt means, such that the ball-shaped end, will be released from its inner hemi-spherical housing 24'a, 24"a, when the pulling tension or force exerted on the auxiliary shaft 22 exceeds the force of the inner hemi-spherical housing 24'a, 24"a, holding the ball-shaped end 22a.

In a preferred embodiment the sleeve includes an appendix 24d protecting the sleeve from water, sand, dirt and other infiltration.

As shown in FIGS. 3–5, a three-part auxiliary shaft assembly 120 to be mounted along a hand-tool shaft, comprises:

an auxiliary shaft such as 122, and a two-part sleeve 124.
The auxiliary shaft has one end 122a and another end.
The one end 122a of the auxiliary shaft is ball-shaped.
The sleeve has a top T, a bottom B, and a symmetrical axis A—A' running from the top to the bottom, and the sleeve is cut in half, along the symmetrical axis A—A', to define the two parts 124' and 124" of the two-part sleeve 124.

Each part of the two-part sleeve, defines an inner hemi-housing, 124'h and 124"h, respectively, parallel to the symmetrical axis of the sleeve, and running from the top to the bottom of the sleeve for receiving half the cross-section of a portion of a hand-tool shaft, as was discussed herein above regarding 14 of FIGS. 1–2, and near the top away from the inner hemi-housing 124'h, 124"h, an inner hemi-spherical housing 124'a, 124"a, at the top, the hemi-cylindrical housing is short of a hemispherical segment.

When the parts of the sleeve are assembled, they define:

with the two hemi-spherical housings, an inner truncated globular housing for the one end 122a of the auxiliary shaft being ball-shaped, with an opening at the top resulting from the hemi-spherical segments cut in the hemi-spherical housing, for the passage of the auxiliary shaft near the one end of the shaft, and with the inner hemi-cylindrical housings, a cylindrical housing for the portion of a hand-tool shaft, such as 14 of FIG. 1, away from the truncated portion of said globular housing, and stopping short thereof, and said two parts of the sleeve being releasably fastened together with bolt means, as discussed herein above, through bolt openings 124"b, 124"c, 124"d.

Thereby, each part of the sleeve defines therein half of the inner truncated globular housing for the auxiliary shaft, and of the housing for the portion of a hand-tool shaft.

In a particular embodiment, the pulling tension exerted by the bolt means and thereby by the two parts of the sleeve having the hemi-spherical segment, is such as to withhold the one end of the auxiliary shaft being ball-shaped until a pulling tension of 40±10 pounds, and preferably 40 pounds, is exerted on the auxiliary shaft pulling off the ball-shaped end from the sleeve, and upon a pulling tension greater than said 40 pounds, to release the one end of the auxiliary shaft being ball-shaped.

It should be borne in mind that the given pulling tension at which the auxiliary shaft is released may be adjusted:

by the tension exerted by said bolt means, by the gap one may define between the two parts of the sleeve, by the gap one may define between the hemi-spherical segments of the two parts of the sleeve. That gap may be obtained in numerous ways: for instance with shims, rubber bands such as 40, 42 disposed between the hand-tool shaft and its housing as shown in FIG. 2, or washers such as schematically shown in part at 44,46 mounted on the bolts between the two parts of the sleeve or sleeves, one of which is shown at 48.

In a preferred embodiment, as shown in FIG. 3, the bolt means consists in 3 pairs of bolts and nuts disposed adjacent said hemi-housing: 2 of said pairs between said hemi-cylindrical housing and said hemi-spherical housing, along said hemi-housing, and one of said 2 pairs being near said top and the other near said bottom of said sleeve. The last of said 3 pairs is symmetrically opposed to said hemi-cylindrical housing on the other side of said hemi-housing, mid-way between said top and bottom.

In a particular embodiment, the hemi-spherical segment defines an angle, as measured between the radii of the sphere, of about 120°± 15°, as seen from FIGS. 3 and 6, enabling a spherical portion of said ball-shaped end of said auxiliary shaft, to be outside the spherical housings, and as shown in FIG. 3, the angle subtended by an arc of said spherical portion on said ball-shaped end, at the center of said ball-shaped end being from 105° to 135°.

As shown in FIGS. 4 and 5, in a preferred embodiment, the cross-section of the sleeve, as taken perpendicular to the symmetrical axis from the center of the inner truncated globular housing and the center of the cylindrical housing, is oval.

Although the housing for the ball-shaped end of the auxiliary shaft 22 or 122 is preferably spherical or globular, that housing may have other configurations, for instance, as shown in FIG. 6, a polygonal housing such as a cube 224a, a pentagon, a hexagon and the like, as long as the top is provided with a restraining element to releasably withhold the ball-shaped end of the auxiliary shaft in the housing whether by fingers, or by continuous or discontinuous annular bulging elements or projections.

It should be borne in mind that said opening at said top, if desired, may be defined by projections selected from the group consisting of continuous and discontinuous, flexibly yielding and unyielding, deformable and non-deformable, hemispherical-inner segments and projections which allow release of the ball-shaped end over a given pulling tension. Though less preferred, the ball end could also be made deformable over said given pulling tension.

Also the inner hemi-housing for half of the ball-shaped end of the auxiliary shaft having the opening at said top, may be defined by projections which break when the pulling tension is greater than said given pulling tension. Furthermore, the auxiliary shaft near the ball-shaped end, may have a line of weakness for that auxiliary shaft to break when the pulling tension is greater than the given pulling tension, and better as shown in FIG. 6, may be provided with a replaceable shaft 222 having female threads to be threadedly mounted to a ball-shaped end 222a having a correspondingly threaded male element.

Tools

As shown in FIGS. 1 and 7, the invention is not limited to shovels, but embraces in general all hand tools having normally a single shaft such as shovels 12 of FIG. 1, rakes such as 30, scrapers and squeegees such as 130 shown as a top view, snow plows such as 330, forks such as 230 shown rotated toward the viewer, snow pushers such as 330 and other hand tools for lifting, picking-up, transporting, pulling and pushing a variety of materials including but not limited to snow, sand, dirt, leaves, powders, earth, vegetables.

In a preferred embodiment, the auxiliary shaft at said another end 22b is provided with a grasping handle. Means to hold the auxiliary shaft against the conventional shaft may also be provided. For instance as shown in FIG. 1, the auxiliary shaft 22 is held against the conventional shaft such as 14, or held together, by providing near the grasping handle, a retaining band 41 having a fabric that can be fastened to itself such as a "Velcro™" fabric. A part of the retaining band 41 may be glued to the auxiliary shaft 22 or fixed with a retaining cap or other fastening means to the auxiliary shaft 22. The retaining band 41 having a fabric that can be fastened to itself, such as "Velcro™" fabric, locks in the two shafts 22 and 14.

Also a spacer 46, for instance a plastic piece, may be provided to space apart the auxiliary shaft 22 a short distance from the hand-tool shaft such as 14 to prevent pinching of fingers between the shafts 22 and 14.

Spacers may also be used to be squeezed between a sliding sleeve and a conventional shaft.

In a preferred embodiment, the auxiliary shaft has a length substantially equivalent to that of said hand-tool shaft as shown in FIG. 1.

Operation

The sleeve is simply divided to be placed around a hand-tool shaft.

While this invention has been described in conjunction with a preferred embodiment thereof, it is clear and obvious from the above description that numerous modifications and changes therein may be made by those skilled in the art without departing from the spirit and scope of this invention as defined by the claims appended hereto.

I claim:

1. A three-part, auxiliary, back-saving safety shaft assembly to be mounted along a hand-tool shaft having a tool, and for said shaft assembly to be mounted near said tool, on said hand-tool shaft, comprising:

an auxiliary shaft, and a two-part sleeve, said auxiliary shaft having one end and another end, said one end of said auxiliary shaft being ball-shaped, said ball-shaped end having a diameter, and a center, said sleeve having a top, a bottom, and a symmetrical axis running from said top to said bottom, and said sleeve being cut in half along said symmetrical axis to define the two parts of said two-part sleeve, each part of said two-part sleeve, defining:

an inner hemi-housing parallel to said symmetrical axis of said sleeve, and running from said top to said bottom of said sleeve, for tight fitting of half the cross-section of a portion of a hand-tool shaft having a tool, and said portion of a hand-tool shaft being near said tool, and each part of said two-part sleeve further defining an inner hemi-housing for receiving half of said ball-shaped end of said auxiliary shaft, said hemi-housing for receiving half of said ball-shaped end of said auxiliary shaft being adjacent to said top of said sleeve, and spaced from said inner hemi-housing for said tight fitting of half the cross-section of a portion of a hand-tool shaft, and said inner hemi-housing for said ball-shaped end having an opening at said top of said sleeve enabling a spherical portion of said ball-shaped end to be displaceable outside of said hemi-housing, the angle subtended by an arc of said spherical portion on said ball-shaped end, at the center of said ball-shaped end being from 105° to 135°, and said two parts of said sleeve being releasably fastened together with bolt means, pulling together said two parts of said sleeve, said bolt means being absent along said opening as defined in said hemi-housing for said ball-shaped end, and along said hemi-housing for said ball-shaped end adjacent to said opening, said two parts of said sleeve, when assembled, thus defining:

a) an inner housing for said ball-shaped end, said opening, in each of said hemi-housings for said ball-shaped end, cooperating to define a common opening, in order:

i) to hold the ball-shaped end, within said inner housing for said ball-shaped end, when the tension exerted on the auxiliary shaft is below a given pulling tension, for allowing rotation of said ball-shaped end within said inner housing for said ball-shaped end, and for enabling a spherical portion of said ball-shaped end to move out of said common opening, the angle subtended by an arc of said spherical portion on said ball-shaped end, at the center of said ball-shaped end being from 105° to 135°, ii) to allow sliding of said ball-shaped end from said inner housing for said ball-shaped end, through said common opening, when said pulling tension exerted on said auxiliary shaft is greater than said given pulling tension, said ball-shaped end exerting a force against said two parts of said sleeve at said common opening, such as to enlarge said common opening, and to instantaneously release said auxiliary shaft from said sleeve, and b) said inner hemi-housings for said tight fitting of half the cross-section of a portion of a hand-tool shaft, parallel to said symmetrical axis acting as a pair of jaws, in order to clamp said portion of a hand-tool shaft.

2. The three-part auxiliary shaft assembly as defined in claim 1, wherein said inner hemi-housing for half of said ball-shaped end of said auxiliary shaft has said opening at said top, defined by discontinuous projections.

3. The three-part auxiliary shaft assembly as defined in claim 1, wherein said inner hemi-housing for half of said ball-shaped end of said auxiliary shaft has said opening at said top, defined by projections which break when the pulling tension is greater than said given pulling tension.

4. The three-part auxiliary shaft assembly as defined in claim 1, wherein said auxiliary shaft near said ball-shaped end, has a line of weakness for said auxiliary shaft to break when the pulling tension is greater than said given pulling tension.

5. The three-part auxiliary shaft assembly, as defined in claim 1, wherein one of said shafts selected from the group consisting of hand-tool shaft and auxiliary shaft, is provided with a spacer in sandwich between said shafts to ease grasping of the free ends of said shafts and one of said shafts is provided with means for holding said shafts together, against said spacer.

6. The three-part auxiliary shaft assembly, as defined in claim 1, wherein said auxiliary shaft has said ball-shaped end threadedly mounted to said auxiliary shaft.

7. A three-part, auxiliary, back-saving safety shaft assembly to be mounted along a hand-tool shaft having a tool, and for said shaft assembly to be mounted near said tool, on said hand tool shaft, comprising:

an auxiliary shaft, and a two-part sleeve, said auxiliary shaft having one end and another end, said one end of said auxiliary shaft being ball-shaped, said ball-shaped end having a diameter, and a center, said sleeve having a top, a bottom, and a symmetrical axis running from said top to said bottom, and said sleeve being cut in half along said symmetrical axis to define the two parts of said two-part sleeve, each part of said two-part sleeve, defining:

an inner hemi-housing parallel to said symmetrical axis of said sleeve, and running from said top to said bottom of said sleeve, for tight fitting of half the cross-section of a portion of a hand-tool shaft having a tool, and said portion of a hand-tool shaft being near said tool, and each part of said two-part sleeve further defining an inner hemi-spherical housing for receiving half of said ball-shaped end of said auxiliary shaft, said inner hemi-spherical housing having a center, said hemi-spherical housing for receiving half of said ball-shaped end of said auxiliary shaft, being adjacent to said top of said sleeve, and spaced from said inner hemi-housing for said tight fitting of half the cross-section of a portion of a hand-tool shaft, and said hemi-spherical housing having a semicircular opening, at said top of said sleeve, enabling a spherical portion of said ball-shaped end to emerge from said hemi-spherical housing, and said semicircular opening having a diameter, said diameter having opposite ends, the angle subtended by an arc of said spherical portion on said ball-shaped end, at the center of ball-shaped end being from 105° to 135°, and said semicircular opening of said hemi-spherical housing defining an angle of 105° to 135°, as measured from the center of said hemi-spherical housing to the opposite ends of said diameter of said semicircular opening, and said two parts of said sleeve being releasably fastened together with bolt means, pulling together said two parts of said sleeve, said bolt-means being absent along said semicircular opening of said hemi-spherical housing for said ball-shaped end, and along said hemi-spherical housing for said ball-shaped end adjacent to said semicircular opening, said two parts of said sleeve, when assembled, defining:

a) an inner truncated globular housing for said ball-shaped end, said semicircular opening, in each of said hemi-spherical housings for said ball-shaped end, cooperating to define a circular opening, in order:

i) to hold the ball-shaped end, within said inner truncated globular housing, when the tension exerted on the auxiliary shaft is below a given pulling tension, for allowing rotation of said ball-shaped end within said inner truncated globular housing, and for enabling a spherical portion of said ball-shaped end to emerge from said circular opening, the angle subtended by an arc of said spherical portion on said ball-shaped end, at the center of said ball-shaped end being from 105° to 135°, ii) to allow sliding of said ball-shaped end from said inner truncated globular housing through said circular opening, when said pulling tension exerted on said auxiliary shaft is greater than said given pulling tension, said ball-shaped end exerting a force against said two parts of said sleeve at said circular opening, such as to enlarge said circular opening, and to instantaneously release said auxiliary shaft from said sleeve, and b) said inner hemi-housings parallel to said symmetrical axis, acting as a pair of jaws, in order to clamp said portion of a hand-tool shaft.

8. The three-part auxiliary shaft assembly as defined in claim 7, wherein said bolt means consists in 3 bolts and 3 nuts for said bolts, each bolt being adjacent to said inner hemi-housing for said tight fitting of half the cross-section of a portion of a hand-tool shaft, and each bolt is running perpendicular to said symmetrical axis of said sleeve, through each of said two parts of said sleeve:

one bolt being near the top of said sleeve, on a side as defined between said inner hemi-housing for said tight fitting of half the cross-section of a portion of a hand-tool shaft, and said hemi-spherical housing, a second bolt on the bottom of said sleeve, and also between said inner hemi-housing for said tight fitting of half the cross-section of a portion of a hand-tool shaft, and said hemi-spherical housing, and a third bolt on another side of the inner hemi-housing for said tight fitting of half the cross-section of a portion of a hand-tool shaft, diametrically opposed to said one side, mid-way between said top and said bottom of said sleeve.

9. The three-part auxiliary shaft assembly as defined in claim 7, wherein said bolt means consists in 3 bolts through one of the two parts of said sleeve, the other part being female threaded for receiving said bolts, each bolt being adjacent to said inner hemi-housing for said tight fitting of half the cross-section of a portion of a hand-tool shaft, and each bolt is running perpendicular to said symmetrical axis of said sleeve, through each of said two parts of said sleeve:

one bolt being near the top of said sleeve, on a side as defined between said inner hemi-housing for said tight fitting of half the cross-section of a portion of a hand-tool shaft, and said hemi-spherical housing, a second bolt on the bottom of said sleeve, and also on said same side, between said inner hemi-housing for said tight fitting of half the cross-section of a portion of a hand-tool shaft, and said hemi-spherical housing, and a third bolt on another side of the inner hemi-housing for said tight fitting of half the cross-section of a portion of a hand-tool shaft, diametrically opposed to said one side, mid-way between said top and said bottom of said sleeve.

10. The three-part auxiliary shaft assembly as defined in claim 7, wherein said auxiliary shaft has a length substantially equivalent to that of said hand-tool shaft.

11. A three-part, auxiliary, back-saving safety shaft assembly to be mounted along a hand-tool shaft having a tool, and for said shaft assembly to be mounted near said tool, on said hand tool shaft, comprising:

an auxiliary shaft, and a two-part sleeve, said auxiliary shaft having one end and another end, said one end of said auxiliary shaft being ball-shaped, said ball-shaped end having a diameter, and a center, said sleeve having a top, a bottom, and a symmetrical axis running from said top to said bottom, and said sleeve being cut in half along said symmetrical axis to define the two parts of said two-part sleeve, each part of said two-part sleeve, defining an inner hemi-cylindrical housing parallel to said symmetrical axis of said sleeve, and running from said top to said bottom of said sleeve for tight fitting of half the cross-section of a portion of a hand-tool shaft having a tool, and said portion of a hand-tool shaft being near said tool, and each part of said two-part sleeve further defining an inner hemi-spherical housing for receiving half of said ball-shaped end of said auxiliary shaft, said inner hemi-spherical housing having a center, said hemi-spherical housing for receiving half of said ball-shaped end of said auxiliary shaft, being adjacent to said top of said sleeve, and spaced from said inner hemi-cylindrical housing for said half the cross-section of a portion of a hand-tool shaft, and said hemi-spherical housing having a semicircular opening, at said top of said sleeve, enabling a spherical portion of said ball-shaped end to be displaceable along the outside of said hemi-spherical housing, and said semicircular opening having a diameter, said diameter having opposite ends, the angle subtended by an arc of said spherical portion on said ball-shaped end, at the center of said ball-shaped end being from 105° to 135°, and said semicircular opening of said hemi-spherical housing, having half of a circular cross-section, said circular cross-section having a diameter, and said diameter defining an angle of 105° to 135°, as measured from the center of said hemi-spherical housing to the opposite ends of said diameter of said semicircular opening, and said two parts of said sleeve being releasably fastened together with bolt means, pulling together said two parts of said sleeve, said bolts means being absent along said semicircular opening of said hemi-spherical housing for said ball-shaped end, and along said hemi-spherical housing for said ball-shaped end adjacent to said semicircular opening, said two parts of said sleeve, when assembled, defining:

a) an inner truncated globular housing for said ball-shaped end, said semicircular opening, in each of said hemi-spherical housings for said ball-shaped end, cooperating to define a circular opening, said circular opening having a circular cross-section, in order:

i) to hold the ball-shaped end, within said inner truncated globu;lar housing, when the tension exerted on the auxiliary shaft is below a given pulling tension, for allowing rotation of said ball-shaped end within said inner truncated globular housing, and for enabling a spherical portion of said ball-shaped end to emerge from said circular opening, the angle subtended by an arc of said spherical portion on said ball-shaped end, at the center of said ball-shaped end being from 105° to 135°, ii) to allow sliding of said ball-shaped end from said inner truncated globular housing through said circular opening, when said pulling tension exerted on said auxiliary shaft is greater than said given pulling tension, said ball-shaped end exerting a force against said two parts of said sleeve at said circular opening, such as to enlarge said circular opening, and to instantaneously release said auxiliary shaft from said sleeve, and b) said inner hemi-cylindrical housings parallel to said symmetrical axis, acting as a pair of jaws, in order to clamp said portion of a hand-tool shaft.

12. The three-part auxiliary shaft assembly as defined in claim 11 wherein said auxiliary shaft has a length substantially equivalent to that of said hand-tool shaft.

13. The three-part auxiliary shaft assembly as defined in claim 11, wherein a cross-section of said sleeve, as taken perpendicular to said symmetrical axis, from the center of said inner truncated globular housing and the center of said cylindrical housing, is oval.

14. The three-part auxiliary shaft assembly as defined in claim 11, wherein said bolt means consists in 3 pairs of bolts and nuts disposed adjacent said hemi-cylindrical housing, each of said pair having one bolt and one nut:
  2 of said pairs between said hemi-cylindrical housing and said hemi-spherical housing, along said hemi-cylindrical housing
  and one of said 2 pairs being near said top and the other near said bottom of said sleeve,
  and the last of said 3 pairs symmetrically opposed to said hemi-cylindrical housing on the other side of said hemi-cylindrical housing, mid-way between said top and bottom.

15. The three-part auxiliary shaft assembly, as defined in claim 11, wherein the side view of said sleeve is diamond-shaped.

* * * * *